United States Patent [19]

Shimokawa

[11] Patent Number: 4,744,293
[45] Date of Patent: May 17, 1988

[54] AUTOMATIC CONTINUOUS FOOD FRYING DEVICE

[75] Inventor: Katsusuke Shimokawa, Moriguchi, Japan

[73] Assignee: Sun Plant Industry Co., Ltd., Osaka, Japan

[21] Appl. No.: 947,804

[22] Filed: Dec. 30, 1986

[51] Int. Cl.⁴ ............................................. A47J 37/12
[52] U.S. Cl. ......................................... 99/404; 99/330; 99/406; 99/409
[58] Field of Search ................. 99/404, 405, 406, 409, 99/360, 443 C, 330, 353

[56] References Cited

U.S. PATENT DOCUMENTS

| | | | |
|---|---|---|---|
| 3,053,265 | 9/1962 | Erie | 99/406 X |
| 3,209,678 | 10/1965 | Benson et al. | 99/409 X |
| 3,731,614 | 5/1973 | Smith et al. | 99/404 |
| 4,234,612 | 11/1980 | Sakakibara et al. | 99/443 C |
| 4,372,200 | 2/1983 | Caridis et al. | 99/404 |
| 4,392,420 | 7/1983 | Caridis et al. | 99/406 |
| 4,706,557 | 11/1987 | Feng et al. | 99/405 X |

FOREIGN PATENT DOCUMENTS 154125  11/1920  United Kingdom .................. 99/405

*Primary Examiner*—James Kee Chi
*Attorney, Agent, or Firm*—Birch, Stewart, Kolasch & Birch

[57] ABSTRACT

An automatic continuous food frying device comprising an oil tank adapted to be filled with a frying oil, a heating means for heating said frying oil, and a means for conveying food in a submerged state in the frying oil, wherein there is provided a pump in the oil tank so that the frying oil may be continuously circulated in the tank.

12 Claims, 9 Drawing Sheets

AUTOMATIC CONTINUOUS FOOD FRYING DEVICE

BACKGROUND OF THE INVENTION

The present invention relates to the food processing apparatus or, more particularly, to an automatic continuous food frying device for commercial use, such as for use by the food processing industry, or the like.

An automatic continuous food frying device according to the prior art is illustrated in FIG. 9, and is so constructed that frying oil disposed in an oil tank is heated by fire tubes (35) of the boiler provided at the bottom of the oil tank, and pieces of raw food (37) is introduced through an opening (36) into the oil tank where it is fried in the course of being conveyed through the oil to an exit opening (40) for removing the fried food by means of a submerging net conveyor (38) and a carrying net conveyor (39). With this construction, there is the drawback in that, since the fire tubes are provided at the bottom of the oil tank, it is difficult to keep the temperature of the frying oil uniform and, hence, to prepare uniformly fried food nicely done which is nicely cooked. Furthermore, because of low-temperature layers of oil encircling pieces of food to be fried, the heat exchangeability of the frying oil is rather poor and, hence, there were limitations to the frying capacity of the device. Still another drawback of the conventional frying device lies in that, since it is pretty difficult to remove the scum from the frying oil, there is caused an early deterioration of the frying oil.

With the aforementioned circumstances in view, it is the object of the present invention to provide an automatic continuous food frying device wherein an improvement in the uniformity of the frying oil temperature, an improvement in the heat exchangeability and augmentation of the frying capacity, and the prevention in an early deterioration of the frying oil, is achieved.

BRIEF SUMMARY OF THE INVENTION

In an automatic continuous food frying device comprising an oil tank to be filled with frying oil, a heating means for heating said heating oil and a means for conveying food to be fried, submerged in the frying oil, there is provided inside the oil tank an impeller having many broad vanes, so as to keep the frying oil circulating in the oil tank by running said impeller. There is also provided a filter midway through the oil circuit, thereby solving the aforementioned problems experienced by the prior art.

By virtue of the flowing frying oil, heat exchange between the boiler fire tubes and the food to be fried is much improved. Also, the fact that the pump is disposed inside the oil tank makes superfluous piping unnecessary.

If the oil circuit is divided into two stages, i.e., upper and lower stages, and the pump is disposed in the lower stage of the circuit, the entire device may be built in a compact structure.

By providing a filter midway through the oil circuit, it is possible to remove scum from the frying oil with ease.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

FIGS. 1 to 8, inclusive, of the accompanying drawings illustrate an example of the embodiment of the present invention.

Figure 1:
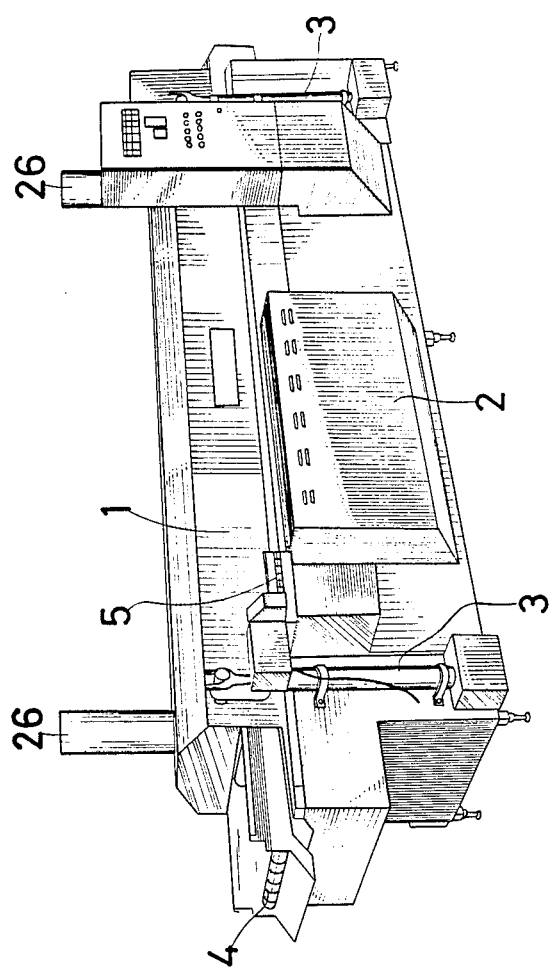
FIG. 1 is a perspective view of the entire apparatus of the present invention.

FIG. 1 is a perspective view of the entire apparatus, wherein numeral (1) indicates the conveyor frame, element (2) the frying oil heating unit, element (3) an oil hydraulic cylinder for lifting up the conveyor frame, element (4) a carrying net conveyor for conveying food to be fried through the frying oil, and element (5) a paper filter carrying net conveyor for conveying the filter paper for removal of scum from frying oil.

Figure 2:
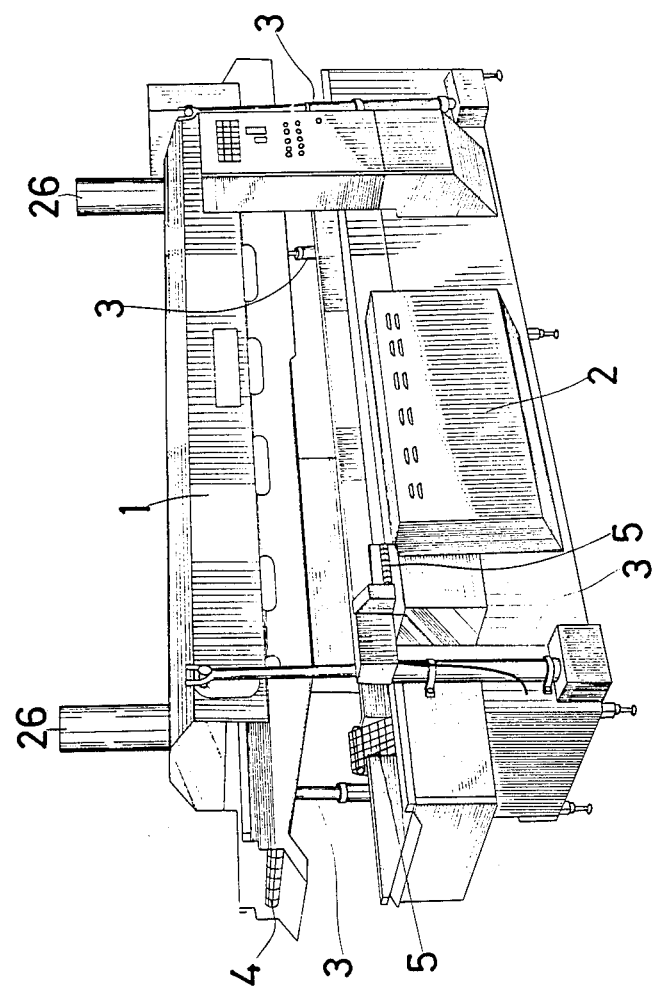
FIG. 2 is a perspective view of the entire apparatus with the conveyor frame in a raised position.

FIG. 2 is a perspective view of the entire apparatus with the conveyor frame (1) being raised by means of four oil hydraulic cylinders (3).

Figure 3:
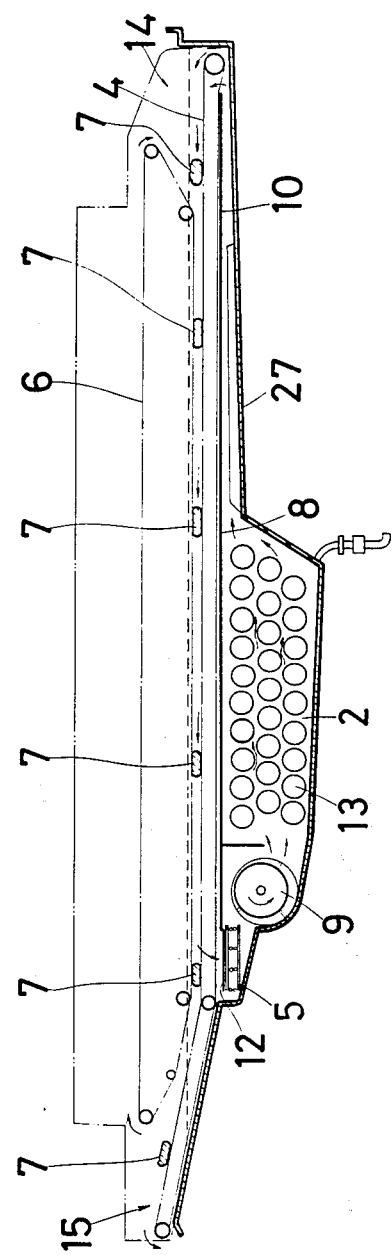
FIG. 3 is a cut-away illustration of the conveyor structure of the present invention.

FIG. 3 shows the construction of the essential part of the frying device. The carrying net conveyor (4) and a submerging net conveyor (6) are fitted on the conveyor frame, and pieces of food to be fried (7) are carried through the oil tank by a combination of these two net conveyors (4) and (6).

The numeral (8) indicates a partition plate whereby the inside of the oil tank is divided into two stages, the upper and lower, and beneath the left end of said partition plate (8), there is disposed a vane pump (9). By virture of the action of said vane pump (9), oil heated by the frying oil heating unit (2) flows from the lower stage of the oil tank, through an oil channel (10), into a frying pool (11) above the partition plate (8) by an entrance at the right end of said partition plate (8), thus making it possible to keep the frying oil circulating in the oil tank.

At the left end of the partition plate (8) and on the upper left side of the vane pump (9), there is provided a paper filter carrying net conveyor (5) in such a manner that it crosses the path of the frying oil flow (at a right angle to the picture plane in FIG. 3), whereby the paper filter (12) is permitted to travel at a slow speed. With this equipment, it is possible to filter the frying oil, thereby removing scum, dregs, or the like, from the circulating oil.

Fire tubes (13) arranged in three tiers in the frying oil heating unit (2) are heated by gas burners, as will be described later on.

The foregoing is an outline of the construction of the present invention. Pieces of food to be fried (7) are thrown into the oil from an opening (14), are carried through frying oil, guided by the carrying net conveyor (4) and the submerging net conveyor (6), for a predetermined time, and are discharged from an opening (15) for removing the fried food.

In order to obtain higher efficiency in heat exchange between oil frying oil and food to be fried, the flow rate of frying oil may be so adjusted as to be slightly higher than the travelling speed of the conveyors (4) and (6), by regulating the revolutions of the vane pump (9).

The conveyors (4) and (6), and the partition plate (8) are installed on the conveyor frame (1). The conveyor frame (1) can be raised and held in a level condition by oil hydraulic cylinders (3). This serves to facilitate cleaning of the inside of the oil tank, while affording convenience in many other aspects, such as maintenance.

Figure 4:
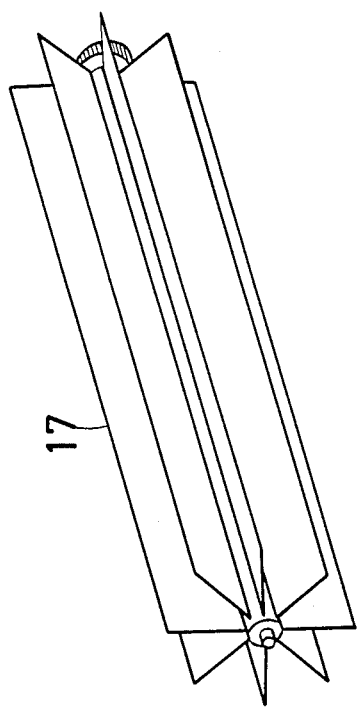
FIG. 4 is a perspective view of the pump impeller.

Although a vane pump (9) is employed in this example of the present invention, there may be employed a pump having an impeller with many broad blades (17) (what is commonly referred to as "sirocco fan"), as illustrated in FIG. 4, instead of a vane pump.

Further, with respect to the frying oil heating unit (2), the heating of frying oil may be done by an open fire.

Figure 5:
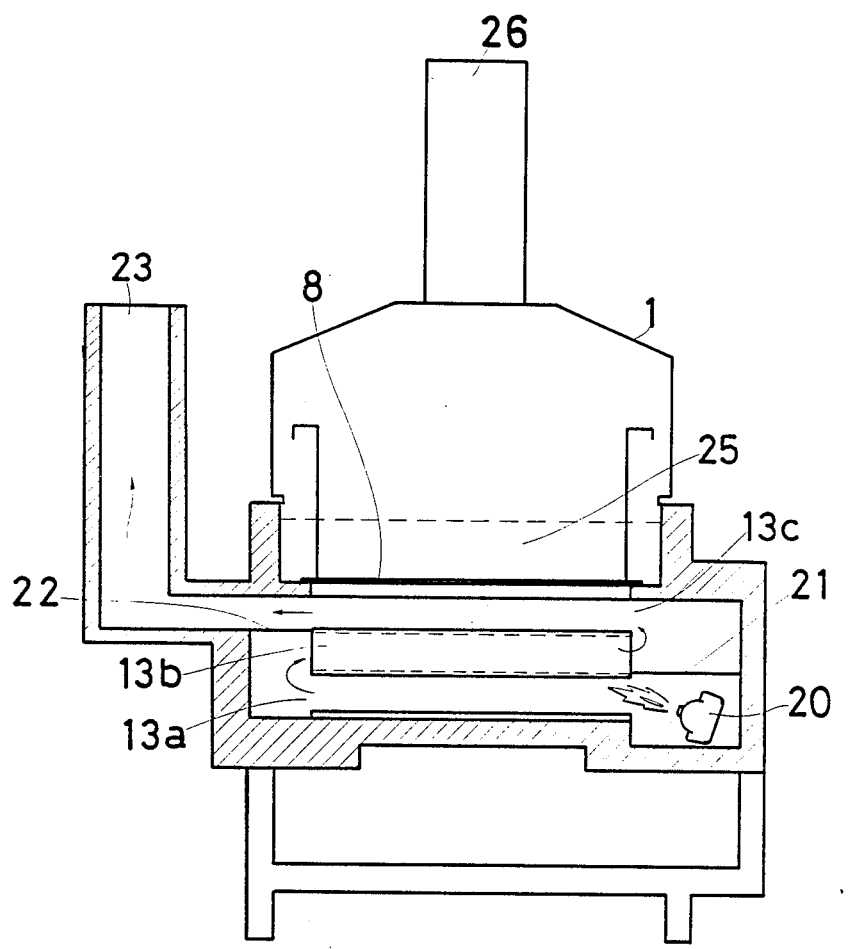
FIG. 5 is a transverse sectional view showing the construction of the frying oil heating unit.

FIG. 5 is a transverse sectional view of the frying oil heating unit (2), showing its construction. The gas burner (20) and fire tubes (13a), (13b) and (13c) are disposed in plurality along the course of flow of frying oil (25) (at a right angle to the picture plane in FIG. 5). The fire tubes of the present invention are disposed in three tiers. On the side where the gas burner (20) is disposed (the right-hand side in the picture), there is provided a partition plate (21) between the bottom tier fire tube (13a) and the middle tier fire tube 13(b). On the opposite side of the burner (20), there is provided a partition plate (22) as a partition between the middle tier fire tube (13b) and the top tire fire tube (13c). By such provision, heat fumes generated by the burner (20) can be conveyed from the bottom tire fire tube (13a) to the middle tier fire tube (13b) and further to the top tier fire tube (13c), thereby ensuring an efficient heat exchange between the gas burner (20) and frying oil (25). The numerals (23) and (26) both indicating an exhaust port.

Figure 6:
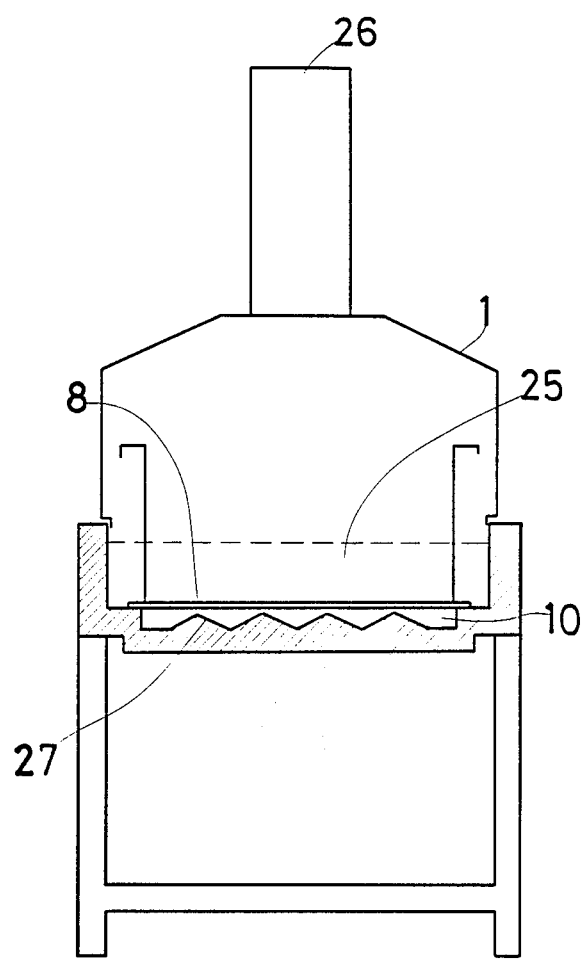
FIG. 6 is a transverse sectional view of the frying oil circuit, showing its structure, of said example.
Figure 7:
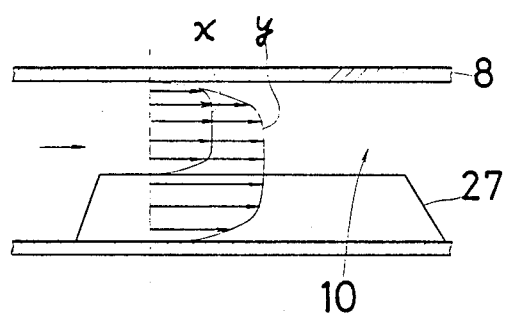
FIG. 7 is a diagram showing the distribution of the frying oil flow rates in the oil circuit.

FIG. 6 is a transverse sectional view of the frying oil channel (10), showing its structure. On the bottom of said frying oil channel (10), there are provided a plurality of ridges (27) disposed in parallel with the flow of the frying oil. Accordingly, as an illustration of the distribution of the frying oil flow rates in the frying oil channel (10), as shown in FIG. 7, the flow rate of frying oil is slow near the wall and becomes quicker and quicker farther away from the wall. In the illustration, the letter (x) indicates the flow rate of the frying oil passing over the top of the ridge (27), and the letter (y) indicates the frying oil passing through the groove between the ridges (27). This means that there arises in the frying oil channels (10) frying oil flowing at several different flow rates. Therefore, the frying oil is, so to speak, stirred up, thereby making the temperature of the frying oil uniform.

By the use of the ridges (27), the frying oil channel (10) is, in substance, narrowed and the speed at which the frying oil is conveyed is increased. This means that it is possible to reduce wasteful radiation of heat.

Still further, as it is possible to virtually decrease the amount of frying oil in the oil tank, the ratio of fresh frying oil, when replenishing oil consumed in the course of manufacturing fried food, will become higher. Thus, the rate of replenishment of the frying oil is higher when the entire amount of frying oil in the oil tank is smaller than when it is larger, producing the effect of preventing early deterioration of the frying oil.

The number of the aforesaid ridges (27) may be chosen as desired, while, as for the length of the ridges (27), there is the freedom of choice, too. They may be provided over the whole length of the frying oil channel (10), or may be provided along only a part or parts of it. Also, the section of the ridges (27) may have other shapes than that shown in the drawings. Any shape, for example, a wavelike form, may be chosen as desired.

Figure 8:
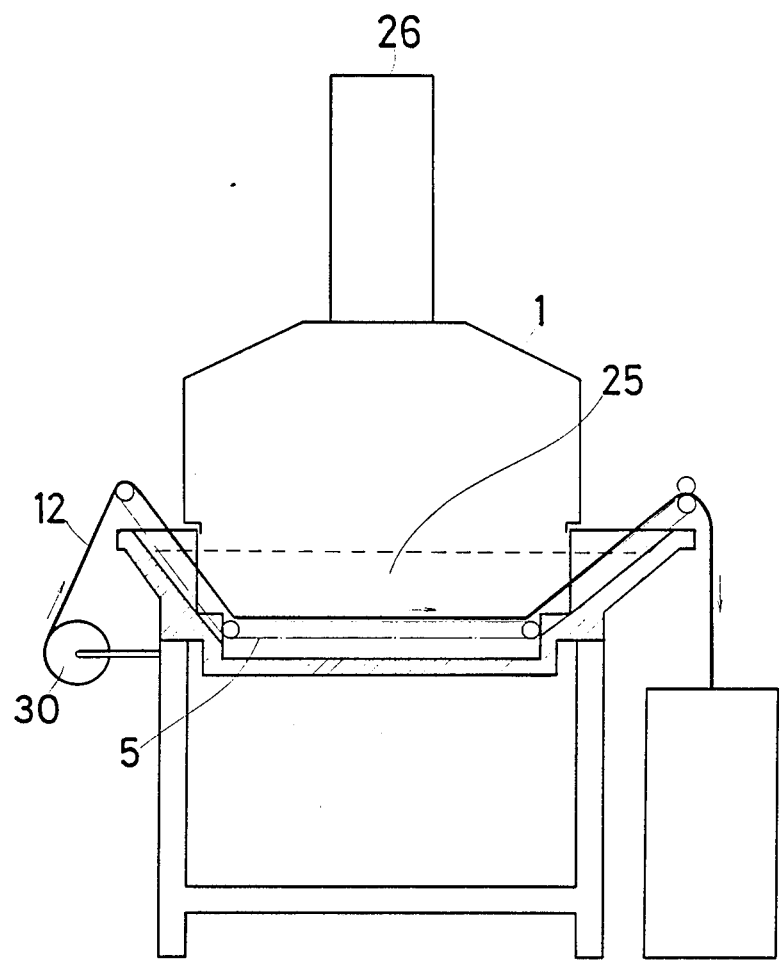
FIG. 8 is a transverse sectional view of the filter unit, showing its construction.
Figure 9:
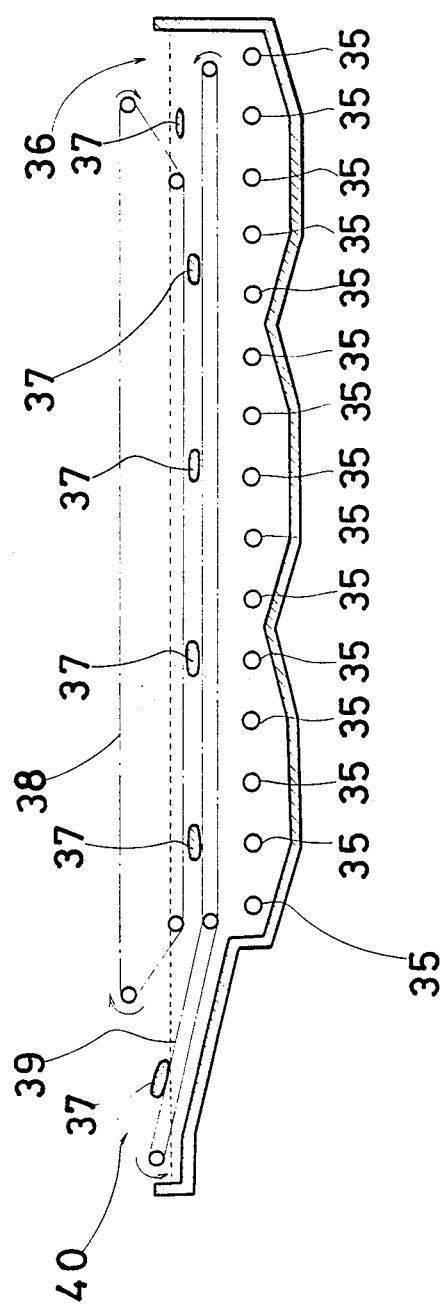
FIG. 9 is an illustration of the structure of the essential part of a food frying device according to the prior art.

FIG. 8 is a transverse sectional view of the filter unit, showing its construction. The paper filter (12), mounted on the paper filter carrying net conveyor (5), travels across the flow of frying oil (25). The numeral (30) indicates a roll of filter paper. By virtue of this equipment, it is possible to continuously scum, dregs, or the like, from the frying oil.

The present invention, with the construction as described in the foregoing paragraphs, produces the following effects.

In the first place, by keeping the frying oil circulating in the oil tank, it is possible to obtain a uniform temperature in the frying oil and, therefore, to produce uniformly fried food, Also, since heat exchange between fire tubes and food to be fried is promoted, the time required for frying is shortened.

Since the oil tank is divided into two stages, i.e., the upper and lower stages, the device has a compact structure.

Since the pump is disposed inside the oil tank, there is no redundant piping and so the construction is simplified.

Since it is possible to continuously remove scum from the frying oil by the filter, early deterioration of oil can be prevented.

Because of the use of the partition plates provided inside the frying oil heating unit, fume heat generated by the gas burner is conveyed to all the fire tubes in three tiers, and the efficiency of the heat exchange to the frying oil is improved.

The use of ridges in the frying oil channel serves, together with the aforementioned circulation of frying oil, to make the oil temperature uniform, and as it further serves to reduce, in substance, the amount of frying oil, the rate of replenishment of fresh frying oil can be made higher, leading to the prevention of early deterioration of the frying oil.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An automatic continuous food frying device which comprises,
   an oil container adapted to be filled with a frying oil, said oil container having an inlet end and an outlet end,
   an impervious partition means disposed in said oil container for separating the oil container into an upper cooking zone and a lower heating zone,
   heating means for heating said frying oil disposed in said heating zone,
   pump means disposed in said heating zone for circulating the frying oil, and
   conveying means disposed in said cooking zone for conveying the food to be fried from the inlet end to the outlet end of the oil container.

2. The automatic continuous food frying device as described in claim 1, wherein the partition plate is disposed approximately in parallel with the surface of the frying oil and defines oil circulating apertures at the inlet and outlet ends thereof, thereby permitting the frying oil to be circulated through the upper cooking zone, through the outlet circulating aperture, through the lower heating zone and through the inlet circulating apertures to the upper cooking zone.

3. The automatic continuous food frying device as described in claim 2, wherein the pump is provided underneath the partition plate.

4. The automatic continuous food frying device as described in claim 1, wherein the pump has an impeller with a plurality of broad blades which are disposed substantially perpendicular to the flow of the frying oil.

5. The automatic continuous food frying device as described in claim 1, wherein the pump is a vane pump.

6. The automatic continuous food frying device as described in claim 2, wherein a filter means is provided at the outlet circulating aperture between the upper cooking zone and the lower heating zone.

7. The automatic continuous food frying device as described in claim 3, wherein a filter means is provided at the outlet circulating aperture between the upper cooking zone and the lower heating zone.

8. The automatic continuous food frying device as described in claim 1, wherein a plurality of longitudinally disposed ridges are provided in the bottom of the oil container and thus in parallel with the flow of the circulating frying oil.

9. The automatic continuous food frying device of claim 3, wherein the pump is disposed between the outlet circulating aperture and the heating means.

10. The automatic continuous food frying device of claim 6, wherein the filter means is a net conveyor provided with a paper filter, said filter means crossing the flow path of the circulating frying oil, whereby the paper filter percolates the frying oil and removes scum, dregs, and the like from the oil.

11. The automatic continuous food frying device of claim 1, wherein the conveying means are opposingly disposed conveyor belts which hold and move the food in a substantially submerged state from the inlet end to the outlet end of the oil container.

12. The automatic continuous food frying device of claim 1, wherein the heating means are fire tubes arranged in tiers in the heating zone and disposed in parallel with each other in the horizontal and vertical direction, said fire tubes being heated by a gas burner.

* * * * *